United States Papuchon

4,035,058

July 12, 1977

[54] ELECTRO-OPTICAL SWITCH AND A METHOD OF MANUFACTURING SAME

[75] Inventor: Michel Papuchon, Paris, France

[73] Assignee: Thomson-CSF, Paris, France

[21] Appl. No.: 585,577

[22] Filed: June 10, 1975

[30] Foreign Application Priority Data

June 14, 1974 France .................... 74.20717

[51] Int. Cl.² ............................................ G02B 5/14
[52] U.S. Cl. ........................ 350/96 C; 350/96 WG
[58] Field of Search .................. 350/96 WG, 96 C

[56] References Cited

U.S. PATENT DOCUMENTS

| | | | |
|---|---|---|---|
| 3,208,342 | 9/1965 | Nethercot, Jr. | 350/96 WG |
| 3,813,142 | 5/1974 | Buhrer | 350/96 WG |
| 3,850,503 | 11/1974 | Riseberg et al. | 350/96 WG |
| 3,860,325 | 1/1975 | Matsushita et al. | 350/96 WG |
| 3,883,220 | 5/1975 | Taylor | 350/96 C |
| 3,909,108 | 9/1975 | Taylor | 350/96 WG |

OTHER PUBLICATIONS

Auracher et al., "New Directional Coupler For Integrated Optics" Journal of App. Phys., vol. 45, No. 11, Nov. 74, pp. 4997–4999.

Primary Examiner—Edward S. Bauer
Assistant Examiner—Stewart Levy
Attorney, Agent, or Firm—Cushman, Darby & Cushman

[57] ABSTRACT

The electro-optical switch according to the invention is formed by parts of two guides made of a ferro-electric material previously polarized in a suitable fashion, enclosed between two electrodes; the application of a voltage between the two electrodes has the effect of varying the refractive index of each of the guides in relation to the other and, consequently, of making it possible to enable or inhibit energy coupling between the two guides. Such a device is applicable in particular to integrated optical circuits.

7 Claims, 7 Drawing Figures

ELECTRO-OPTICAL SWITCH AND A METHOD OF MANUFACTURING SAME

The present invention relates to an electrically controlled radiated energy switch, intended in particular for the field of integrated optical systems which are thus designated by analogy with integrated electronic systems, monolithic structures which employ thin film techniques. The invention likewise relates to a method of manufacturing such a switch.

A switch of this kind can be built in accordance with the directional coupler principle, that is to say a device comprising two waveguides the coupling between which is variable between 0 and 100% under the action of an external control arrangement. To this end, two radiated energy guides are disposed parallel to one another over a length referred to as the coupling length and defined in such a manner that the coupling is maximum, that is to say that the whole of the energy has been transmitted from one guide to the other at the end of the length L. If the guides or the material separating them are made of an electro-optical material, it is possible by an electrical control arrangement to vary one of the parameters defining the length L, for example the optical refractive index, so that the length L corresponds then to a situation of minimum coupling. Problems then arise associated with the effectiveness of control (the coupling must vary from 0 to 100% in order for the device to constitute a true switch) and with the magnitude of the electrical control powers which are required. In other words, when integrated optical systems are concerned these systems must be compatible with conventional integrated electronic circuits.

One result which the present invention seeks to secure, is the creation of a fast electro-optical switch, which can be controlled by relatively low-power electrical signals and is applicable to integrated electro-optical circuits.

According to the invention there is provided an electro-optical switch for conveying radiated energy from a first electro-optical guide to a second electro-optical guide wherein parts respectively of said first and second guides constituted by a ferro-electric material are arranged parallel with one another over a given length, known as the coupling length, at a distance from one another said distance being adapted for causing the energy conveyance said parts of said first and second guides being polarized in a transverse direction and in opposite senses, said electro-optical switch further comprising control means for delivering a control signal and electrical inductive means controlled by said control signal for applying to said parts of guides an electric field parallel to said transverse direction, said electric field inducing opposite index changes in said parts of guides, the conveyance of said energy being induces and stopped according to said changes.

The invention likewise relates to a method of manufacturing this kind of switch.

The invention will be better understood from a consideration of the ensuing description and the attached drawings in which.

In these various figures, similar elements are designated by similar references.

Figure 1:
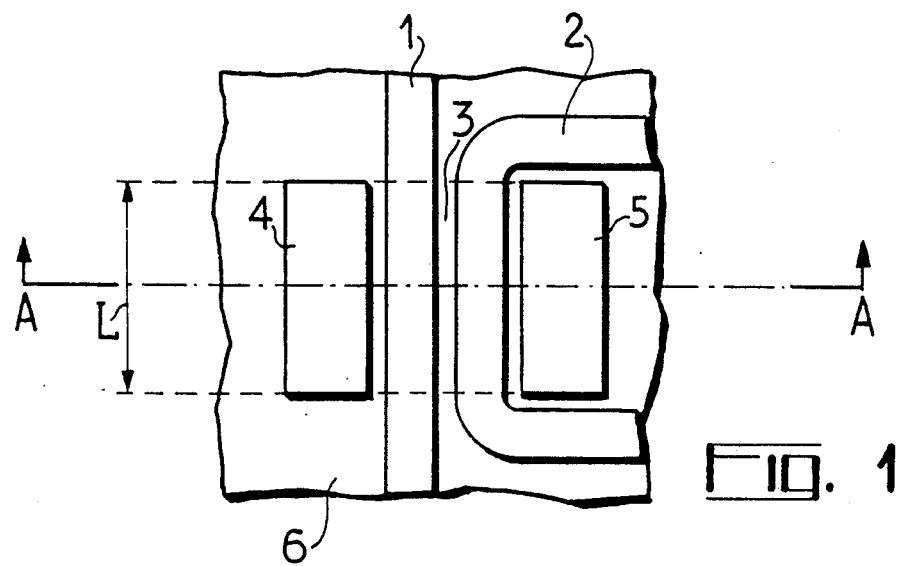
FIG. 1 illustrates a plan view and FIG. 2 a sectional view of an embodiment of the switch in accordance with the invention.

In FIG. 1, part of the insulation substrate 6 has been shown carrying a switch in accordance with the invention, formed by two radiated energy parts of guides 1 and 2 and two metal electrodes 4 and 5, deposited upon the substrate 6. The guides 1 and 2 are mutually parallel over a length L referred to as the coupling length, the guide 2 diverging from the guide 1 in a substantially normal direction, at either end of the coupling length L; the guides will preferably have the same refractive index $n_1$, the same width $a$ and the same thickness $b$, and over the coupling length will be separated by a short interval $c$ of the order of magnitude of, or less than, the width $a$, this in order that coupling over the distance L shall be achieved with an efficiency to close to 100%, as explained in more detail hereinafter. The electrodes 4 and 5 are arranged over the coupling length L, to either side of the guides 1 and 2, the electrode 4 along the guide 1 and the electrode 5 along the guide 2; these electrodes can either be separated from the guides by an interval $d$ as shown in FIG. 1, or may instead be in contact with the guides.

Figure 2:
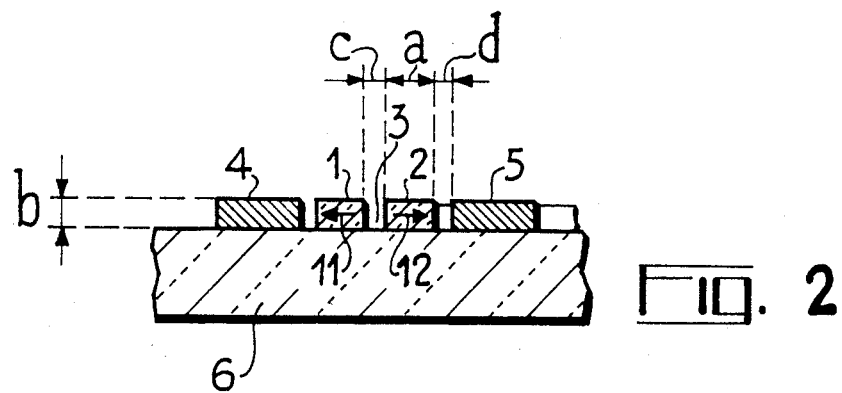

FIG. 2 is a sectional view taken along the axis AA of the device described hereinbefore, in which the substrate 6 on which the guides 1 and 2 of width $a$ and thickness $b$, and the electrodes 4 and 5, separated from the guides 1 and 2 by an interval $d$, are located.

The refractive index of the substrate 6 is $n_2$ and that of the medium 3, separating the two guides and constituted for example by air, is $n_3$.

In operation, it is well-known that when radiated energy propagates through a waveguide, for example the guide 1, and when a second guide 2 is arranged at a sufficiently short interval, $c$, from the first, coupling takes place between the two guides through the agency of a phenomenon referred to as the evanescent wave phenomenon, such waves having an intensity which decreases extremely rapidly in the direction perpendicular to the walls of the guide. This coupling is at a maximum when the two guides are sufficiently close, namely in the order of some few wavelengths of the energy involved, and are identical, that is to say have the same dimension ($a$ and $b$ in this case) and the same refractive index, $n_1$, so that total transfer of energy from one guide to the other takes place; it is thus possible to define a length L, known as the coupling length, in respect of which the whole of the energy supply to the first guide, 1, is transferred to the second, 2, and is maintained there if the two guides separate after the distance L in the manner shown in FIG. 1. The distance L depends upon the optical and geometric parameters of the structure and in particular upon the refractive indices $n_1$, $n_2$ and $n_3$.

To design an electro-optical switch, which will electrically control the transfer of energy from one guide to the other, the guides 1 and 2, are made of an electro-optical material, the refractive index $n_1$ of which can vary under the action of an electric field developed between the electrodes 4 and 5. More precisely, the guides 1 and 2 will be made of a ferro-electric material previously polarized in the same direction (that of the axis of section AA) but in opposite directions in the respective guides, as indicated by the arrows 11 and 12 in FIG. 2. The application of a potential difference between the electrodes 4 and 5, for example "+" to 4 and "−" to 5, brings about a variation $\Delta n_1$ in the refractive index $n_1$ of the material: the variation is $-\Delta n_1$ in the case of the guide 1 and $+\Delta n_1$ in the case of the guide 2. The different parameters are chosen so that the assymmetry thus introduced between the two guides produces, in respect of the length L, a minimum coupling which is virtually zero.

Thus, a device has been created which does or does not switch the whole of the radiated energy from one of the guides to the other, depending upon whether an electrical control signal is not or is applied to it.

The reverse mode of operation is of course entirely possible: it is merely necessary to choose a length L corresponding to a minimum coupling factor in the absence of any electric field.

It should be pointed out that the electrical control voltages involved by this device are small, of the order of some few volts only and are entirely compatible with the amplitudes put out by the integrated electronic circuits.

In addition, electrodes 4 and 5 can be arranged at a distance d from the guides in order to prevent losses due to metallic absorption of the radiated energy when reflected at the guide-electrode interface. This distance need not be accurately determined and need not even be completely constant over the whole of the length L. Finally, in the embodiment described in FIGS. 1 and 2, the material 3 located between the guides is constituted by air.

In the preferred embodiment described hereinafter, it is constituted by the substrate.

Figure 3:
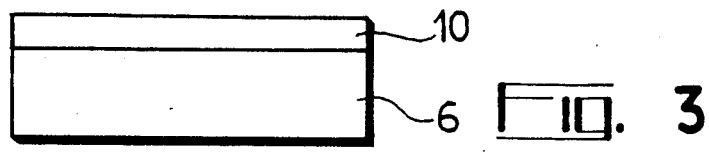
FIGS. 3, 4, 5 and 6 illustrate the different stages in the method of manufacture of the switch in accordance with the invention.

FIG. 3 illustrates the first stage in the method of the invention. It illustrates the substrate 6 of refractive index $n_2$, constituted by the ferro-electric material lithium tantanate, covered with a layer 10 of metal, such for example as platinum.

Figure 4:
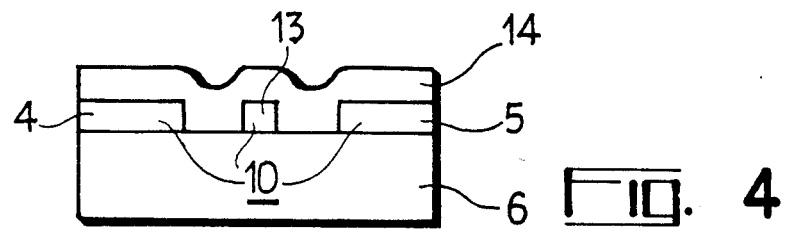

FIG. 4 illustrates the substrate 6 and the layer 10 cut to form three electrodes: the electrodes 4 and 5 and a central electrode 13. The cutting can be performed by any of the masking techniques conventionally employed in integrated circuits. On the assembly there is deposited a layer 14 of niobium which is diffused into those zones of the substrate 6, of channel form, which are exposed by the layer 10.

Figure 5:
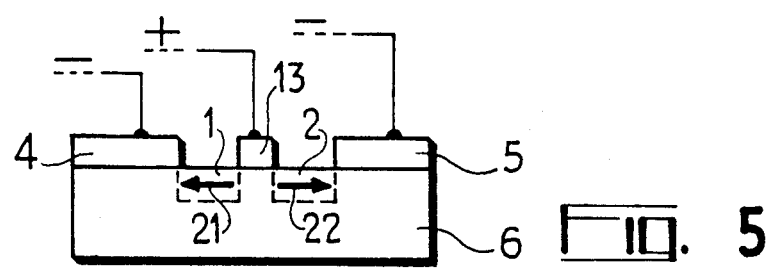

After diffusion and possibly cleaning of the niobium covering the electrodes 4, 13 and 5, two zones are obtained containing niobium and consequently having a refractive index $n_1$, which is higher than that $n_2$ of the substrate, these zones constituting the guides 1 and 2 as FIG. 5 shows. The assembly is heated to beyond the Curie temperature of the material, in this case in the order of 1100° C, whereafter, between the electrodes two electric fields are applied in the manner indicated in FIG. 5 by the arrows 21 and 22, the fields having the same amplitude and the same direction but opposite senses; finally, the assembly is slowly cooled in order to polarize the guides 1 and 2, in the manner described earlier.

Figure 6:
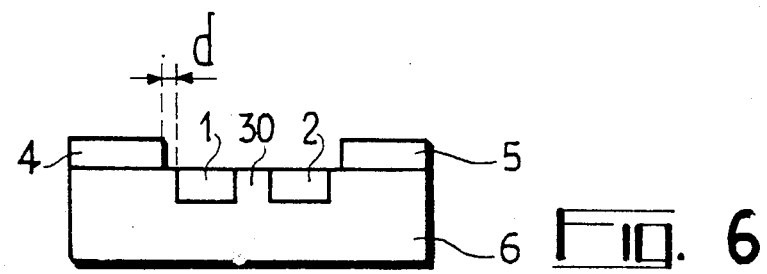

In a final stage, shown in FIG. 6, the central electrode 13 is discarded, its presence being in particular responsible for the occurrence of losses due to metallic absorption, and the electrodes 4 and 5 spaced away from the guides 1 and 2 by the distance d. As described earlier on, this latter operation, which can also be carried out using conventional masking techniques, does not require the same order of accuracy as the preceding operations.

In this fashion, the switch in accordance with the invention has been produced, the switch being constituted by the two radiated energy guides 1 and 2 and the two electrodes 4 and 5, the two guides in this embodiment being separated by the thickness of the substrate marked 30.

One advantage of this method, in particular, is that it makes it possible to utilise the same operation in order to manufacture the electrodes 4 and 5 and to mask the substrate for purposes of diffusion.

Figure 7:
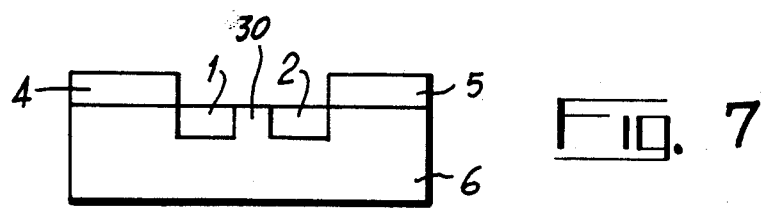
FIG. 7 illustrates an arrangement in which the electrodes and guides are in contact.

In the arrangement of FIG. 7, the electrodes 4 and 5 are arranged on the substrate 6 in contact with guides 1 and 2.

By way of non-limitative example, the switch in accordance with the invention has been manufactured using guides of width, a, in the order of 5 microns, parallel with one another over a distance L and separated by a distance (c) of around 2 microns, the control voltage being less than 5 volts.

What I claim is:

1. An electro-optical switch for conveying radiated energy from a first electro-optical guide to a second electro-optical guide wherein parts respectively of said first and second guides constituted by a ferroelectric material are arranged parallel with one another over a given length, known as the coupling length, at a distance from one another, said distance being adapted for causing the energy conveyance, said parts of said first and second guides being polarized in a transverse direction and in opposite senses, said electro-optical switch further comprising control means for delivering a control signal and electrical inductive means controlled by said control signal for applying to said parts of guides an electric field parallel to said transverse direction, said electric field inducing opposite index changes in said parts of guides, the conveyance of said energy being induced and stopped according to said changes.

2. An electro-optical switch as claimed in claim 1, wherein said parts of guides are arranged on a substrate, said electrical inductive means comprising two electrodes arranged on said substrate at either side of the assembly formed by said parts of guides substantially over said coupling length and along same.

3. A switch as claimed in claim 2, wherein said parts of guides are substantially identical in size and have the same refractive index in the absence of said control signal.

4. A switch as claimed in claim 3, characterised in that said guides are separated over said coupling length, by an air gap.

5. A switch as claimed in claim 3, wherein said parts of guide are separated by a fraction of said substrate.

6. A switch as claimed in claim 1, wherein said distance is at the most of the order of a few wavelengths of said radiated energy.

7. A switch as claimed in claim 1, wherein said electrodes are arranged on said substrate in contact with said guides.

* * * * *